United States Patent
Chen et al.

(10) Patent No.: US 9,747,828 B2
(45) Date of Patent: *Aug. 29, 2017

(54) LIQUID CRYSTAL DISPLAY WITH REDUCED NUMBER OF DATA LINES AND METHOD FOR DRIVING THE LIQUID CRYSTAL DISPLAY

(71) Applicant: Shenzhen China Star Optoelectronics Technology Co., Ltd., Shenzhen, Guangdong (CN)

(72) Inventors: Lixuan Chen, Guangdong (CN); Chih-tsung Kang, Guangdong (CN); Weiwei Zheng, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 332 days.

This patent is subject to a terminal disclaimer.

(21) Appl. No.: 14/400,549

(22) PCT Filed: Oct. 24, 2014

(86) PCT No.: PCT/CN2014/089462
§ 371 (c)(1),
(2) Date: Nov. 11, 2014

(87) PCT Pub. No.: WO2016/061818
PCT Pub. Date: Apr. 28, 2016

(65) Prior Publication Data
US 2016/0275839 A1   Sep. 22, 2016

(30) Foreign Application Priority Data
Oct. 21, 2014 (CN) .......................... 2014 1 0563983

(51) Int. Cl.
*G02F 1/1362* (2006.01)
*G09G 3/20* (2006.01)
*G09G 3/36* (2006.01)

(52) U.S. Cl.
CPC ......... *G09G 3/2003* (2013.01); *G02F 1/1362* (2013.01); *G02F 1/136286* (2013.01);
(Continued)

(58) Field of Classification Search
CPC .......... G02F 1/136286; G02F 2201/40; G02F 1/134309; G02F 1/1362; G02F 2201/52;
(Continued)

(56) References Cited

U.S. PATENT DOCUMENTS

2008/0252624 A1* 10/2008 Jang ................. G09G 3/3648
345/204
2016/0274433 A1* 9/2016 Chen ................... G09G 3/2011

FOREIGN PATENT DOCUMENTS

CN            101285950 A     10/2008

* cited by examiner

*Primary Examiner* — Temesghen Ghebretinsae
*Assistant Examiner* — Ivelisse Martinez Quiles
(74) *Attorney, Agent, or Firm* — Andrew C. Cheng

(57) ABSTRACT

The present invention discloses a liquid crystal display panel comprising: a display area in which a display area in which an array of pixel units is disposed, each of the pixel unit at least comprises a blue sub-pixel; a plurality of scan lines for providing a plurality of scan signals to the pixel units; and a plurality of data lines for providing a plurality of data signals to the pixel units, wherein the blue sub-pixels of the pixel units in every two neighbored columns are coupled to a first data line, and the first data line provides an identical data signal to the blue sub-pixels in a same line of the two neighbored columns. The present invention further discloses a method for driving the liquid crystal panel and a liquid
(Continued)

crystal display comprising the liquid crystal panel in the disclosure.

8 Claims, 1 Drawing Sheet

(52) U.S. Cl.
CPC ............ *G09G 3/2074* (2013.01); *G09G 3/36* (2013.01); *G09G 3/3688* (2013.01); *G02F 2201/52* (2013.01); *G09G 2300/0452* (2013.01); *G09G 2310/027* (2013.01); *G09G 2320/0285* (2013.01); *G09G 2320/0626* (2013.01); *G09G 2330/021* (2013.01)

(58) Field of Classification Search
CPC ...... G09G 3/2011; G09G 5/06; G09G 3/3648; G09G 3/3659; G09G 3/3607; G09G 2300/0804; G09G 2320/0693; G09G 2320/0673; G09G 2300/0404; G09G 2320/0295; G09G 2300/0452; G09G 3/3685; G09G 2300/0443; G09G 2320/0233; G09G 2320/0209; G09G 2320/0666; G09G 3/2003; G09G 3/3688; G09G 3/2074; G09G 3/36; G09G 2310/027; G09G 2320/0626; G09G 2330/021; G09G 2320/0285
See application file for complete search history.

LIQUID CRYSTAL DISPLAY WITH REDUCED NUMBER OF DATA LINES AND METHOD FOR DRIVING THE LIQUID CRYSTAL DISPLAY

FIELD OF THE INVENTION

The present invention relates to a technique field of liquid crystal display, and more particularly to a liquid crystal panel and method for driving the same, and further related to a liquid crystal display comprising the liquid crystal panel.

BACKGROUND OF THE INVENTION

A liquid crystal display (LCD) is a thin flat display apparatus which comprises a certain amount of color or monochrome pixels and is disposed before a light source or a reflecting surface. Because the liquid crystal display has low power consumption and is characterized in high display quality, small size and light weight, it is favored by peoples and becomes a main display apparatus. Nowadays, the major one of the liquid crystal display is the thin film transistor (TFT) liquid crystal display, wherein the main component thereof is a liquid crystal panel.

Generally, a liquid crystal panel comprises an array of pixel units, each of the pixel units comprises a red sub-pixel, a green sub-pixel and a blue sub-pixel, and the liquid crystal panel further comprises a crisscross of a plurality of data lines and scan lines. In a conventional liquid crystal panel, the sub-pixels of all the pixel units in the same line are coupled to the same scan line and are provided with the scan signal by the scan line; the red sub-pixels of all the pixel units in the same column are coupled to the same data line and are provided with the data signal by the data line; the green sub-pixels of all the pixel units in the same column are coupled to the same data line and are provided with the data signal by the data line; and the blue sub-pixels of all the pixel units in the same column are coupled to the same data line and are provided with the data signal by the data line. Because each sub-pixel in each column is coupled to a data line, the amount of data line is increased, and the difficulty of manufacturing process and the cost of the liquid crystal panel are increased.

SUMMARY OF THE INVENTION

In view of the drawbacks of the conventional technique, one of the objects of the present invention is to provide a liquid crystal panel, which reduces an amount of the data lines, power consumption of the liquid crystal panel, and difficulty of designing and manufacturing liquid crystal panel, and saves producing cost.

To achieve the object described above, a technique solution adopted by the present invention is:

a liquid crystal panel, comprising:

a display area in which an array of pixel units is disposed, each of the pixel unit at least comprises a blue sub-pixel;

a plurality of scan lines for providing a plurality of scan signals to the pixel units; and a plurality of data lines for providing a plurality of data signals to the pixel units, wherein the blue sub-pixels of the pixel units in every two neighbored columns are coupled to a first data line, and the first data line provides an identical data signal to the blue sub-pixels in a same line of the two neighbored columns.

Wherein, the identical data signal makes the blue sub-pixels in the same line of the two neighbored columns be with a same brightness value.

Wherein, each of the pixel units further comprise a red sub-pixel and a green sub-pixel, the sub-pixels of the pixel units in each line are coupled to a same one of the scan lines, the red sub-pixels of the pixel units in a same column are coupled to a second data line, and the green sub-pixels of the pixel units in the same column are coupled to a third data line.

Wherein, the liquid crystal panel further comprises a gate controller and a source controller, the gate controller provides the scan signals to the pixel units through the scan lines, and the source controller provides the data signals to the pixel units through the data lines.

A method for driving the liquid crystal panel described above, wherein driving the liquid crystal panel so as to display an image according to a reset data parameter of the blue sub-pixel comprises:

obtaining a brightness curve corresponding to a whole grey level of the blue sub-pixel in the liquid crystal panel;

when a brightness value of the $m^{th}$ blue sub-pixel and the brightness value of the $m+1^{th}$ blue sub-pixel in the same line of the image to be display are $LvB_m$ and $LvB_{m+1}$, respectively, setting the brightness values of the $m^{th}$ blue sub-pixel and $m+1^{th}$ blue sub-pixel to LvB according to the equation:

$$LvB = \frac{LvB_m + LvB_{m+1}}{2},$$

respectively; wherein m=1, 3, 5, 7 . . . ;

determining a grey value corresponding to LvB according to the obtained brightness curve and re-defining a look-up table of the liquid crystal panel related to the blue sub-pixel; and driving the liquid crystal panel according to the look-up table, wherein every two neighbored blue sub-pixels in the same line are provided with the identical data signal.

Wherein, each of the pixel units further comprises a red sub-pixel and a green sub-pixel, and the data signals provided to the red sub-pixel and the green sub-pixel remains the same when the data parameter of the blue sub-pixel is reset.

Wherein, the liquid crystal panel further comprises a gate controller and a source controller, the gate controller provides the scan signals to the pixel units through the scan lines, and the source controller provides the data signals to the pixel units through the data lines.

Wherein, the whole grey level comprises a total grey level of 256 from grey level 0 to grey level 255.

In another aspect, the present invention provides a liquid crystal display comprising a liquid crystal panel and a backlight module, the liquid crystal panel and the backlight module being disposed oppositely, and the backlight module providing a light source to the liquid crystal panel so as to display an image by the liquid crystal panel, wherein the liquid crystal panel is the liquid crystal panel described above.

Wherein, the liquid crystal panel is driven by the method for driving liquid crystal panel described above.

Compared with the conventional technique, in the liquid crystal panel provided by the present invention, the blue sub-pixels of the pixel units in every two neighbored columns are coupled to the same data line such that an amount of the data line coupled to the blue sub-pixels in the entire liquid crystal panel is reduced to one half. When the structure of the panel is changed, the driving method is changed so as to make the two blue sub-pixels, which are coupled to the same data line, of the pixel units in the same line be with the same brightness parameter such that the liquid crystal panel maintains good display effect. The liquid crystal panel and method for driving the same reduces an amount of the data lines, power consumption of the liquid crystal panel, and difficulty of designing and manufacturing liquid crystal panel, and saves producing cost.

DETAILED DESCRIPTION OF PREFERRED EMBODIMENTS

Figure 1:
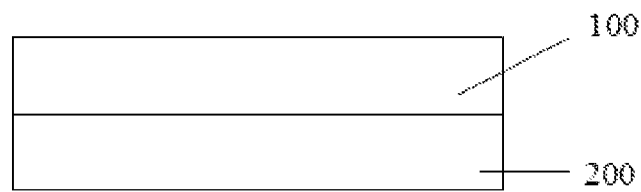
FIG. 1 is a structural schematic diagram of a liquid crystal display provided by the embodiment of the present invention.

In order to make the objects, technique solutions and advantages of the present invention be clearer, the present invention will now be described more specifically with reference to the following embodiments with the attached drawings As shown in FIG. 1, the liquid crystal display provided by the present embodiment comprises a liquid crystal panel 100 and a backlight module 200. The liquid crystal panel 100 and the backlight module 200 are disposed oppositely, and the backlight module 200 provides a displaying light source to the liquid crystal panel 100 so as to display an image by the liquid crystal panel.

Figure 2:
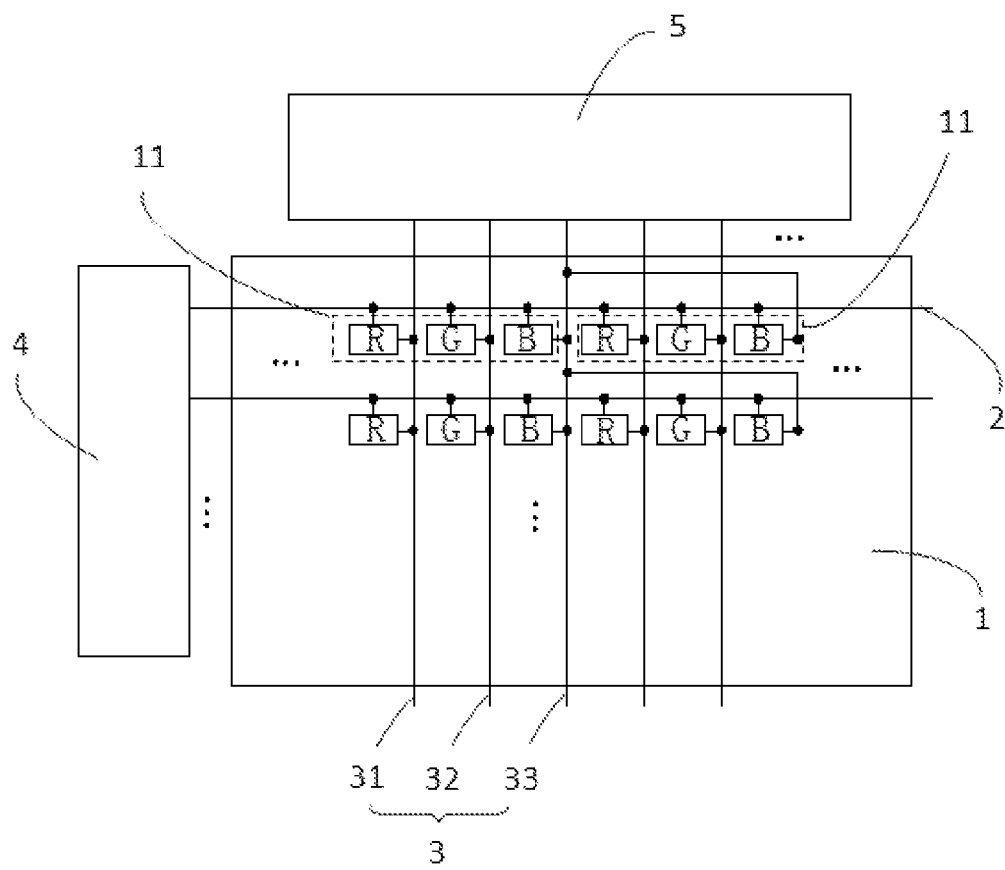
FIG. 2 is a structural schematic diagram of a liquid crystal panel provided by the embodiment of the present invention.

As shown in FIG. 2, the liquid crystal panel 100 in the embodiment comprises a display area 1 in which an array (only a part of the array is shown for example in the attached drawing) of pixel units 11 is disposed, a plurality of scan lines 2 and a plurality data lines 3. Each pixel unit 11 comprises a red sub-pixel R, a green sub-pixel G and a blue sub-pixel B. Wherein, the sub-pixels R, G and B of all the pixel units in the same line are coupled to the same scan line 2, and are provided with the scan signal by the scan line 2; the red sub-pixels R of all the pixel units 11 in the same column are coupled to the same data line 31 and are provided with the data signal by the data line 31; the green sub-pixels G of all the pixel units 11 in the same column are coupled to the same data line 32 and are provided with the data signal by the data line 32; the blue sub-pixels B of all the pixel units 11 in the two neighbored column (the mth column and the m+1th column, wherein m=1, 3, 5, 7, . . . ) are coupled to the same data line 33, and the two neighbored blue sub-pixels B in the same line are provided with an identical data signal by the data line 33.

Moreover, as shown in FIG. 2, the liquid crystal panel 100 further comprises a gate controller 4 and a source controller 5, the gate controller 4 provides the scan signals to the pixel units 11 through the scan lines 2, and the source driver 5 provides data signals to the pixel units 11 through the data lines 3.

Combining with the improvement on the structure of the liquid crystal panel, the present embodiment further provides a method for driving the liquid crystal panel so as to display an image according to a reset data parameter of the blue sub-pixel. The method comprises the following steps.

In the beginning, a brightness curve corresponding to a whole grey level (grey level 0~grey level 255) of the blue sub-pixel in the liquid crystal panel is obtained. That is, a real brightness value $LvB_0$ corresponding to each grey level value is measured.

After that, when a brightness value of the $m^{th}$ blue sub-pixel and the brightness value of the $m+1^{th}$ blue sub-pixel in the same line of the image to be display are $LvB_m$ and $LvB_{m+1}$, respectively, the brightness values of the $m^{th}$ blue sub-pixel and $m+1^{th}$ blue sub-pixel is set to $LvB$ according to the equation:

$$LvB = \frac{LvB_m + LvB_{m+1}}{2},$$

respectively; wherein m=1, 3, 5, 7 . . . .

Furthermore, a grey value corresponding to LvB is determined according to the obtained brightness curve, and a look-up table LUT (Look-Up-Table) of the liquid crystal panel related to the blue sub-pixel is re-defined.

The liquid crystal panel is driven according to the look-up table LUT, wherein every two neighbored blue sub-pixels in the same line are provided with the identical data signal.

For example, when the grey level values going to be provided to the $1^{st}$ and $2^{nd}$ blue sub-pixels are B1 and B2, respectively, and the corresponded brightness values are $LvB_1$ and $LvB_2$, respectively, the brightness values of the $1^{st}$ and $2^{nd}$ blue sub-pixels are reset to LvB according to the equation:

$$LvB = \frac{LvB_1 + LvB_2}{2}.$$

After that, the grey level value B corresponding to the brightness value LvB is determined according to the brightness curve, and the grey values B1 and B2 going to be provided to the $1^{st}$ and $2^{nd}$ blue sub-pixels are replaced by the grey value B. By this method, the grey levels of the blue sub-pixels in the whole liquid crystal panel are re-calculated, a look-up table LUT after re-calculating is built, and the data signals are provided to the pixel units according to the look-up table LUT such that the image is displayed.

Wherein, the data signals provided to the red sub-pixels and the green sub-pixels remains the same when the data parameter of the blue sub-pixel is reset.

In summary, compared with the conventional technique, in the liquid crystal panel provided by the present invention, the blue sub-pixels of the pixel units in every two neighbored columns are coupled to the same data line such that an amount of the data line coupled to the blue sub-pixels in the entire liquid crystal panel is reduced to one half. When the structure of the panel is changed, the driving method is changed so as to make the two blue sub-pixels, which are coupled to the same data line, of the pixel units in the same line be with the same brightness parameter such that the liquid crystal panel maintains good display effect. The liquid crystal panel and method for driving the same reduces an amount of the data lines, power consumption of the liquid crystal panel, and difficulty of designing and manufacturing liquid crystal panel, and saves producing cost.

Those described above are the embodiments of the present application. It is noted that various improvements and modifications can be made within the theory of the present application by those with ordinary skill in the technique field, and these improvements and modifications should be included in the protection scope of the present application.

What is claimed is:

1. A method for driving a liquid crystal panel, wherein the liquid crystal panel comprises a display area, a plurality of scan lines and a plurality of data lines, wherein an array of pixel units is disposed in the display area, each pixel unit of the pixel units at least comprises a blue sub-pixel, the scan lines provide a plurality of scan signals to the pixel units, and the data lines provide a plurality of data signals to the pixel units, wherein blue sub pixels of the pixel units in every two neighbored columns are coupled to a first data line, and the first data line provides an identical data signal to the blue sub-pixels in a same line of the two neighbored columns; wherein driving the liquid crystal panel so as to display an image according to a reset data parameter of the blue sub-pixel comprises;

obtaining a brightness curve corresponding to a whole grey level of the blue sub-pixel in the liquid crystal panel;

when a brightness values of $m^{th}$ blue sub-pixel and a brightness value of $m+1^{th}$ blue subpixel in the same line of the two neighbored columns are $LvB_m$ and $LvB_{m+1}$, respectively, setting the brightness values of the $m^{th}$ blue sub-pixel and the $m+1^{th}$ blue subpixel to LvB according to equation:

$$LvB = \frac{LvB_m + LvB_{m+1}}{2},$$

respectively; wherein m=1, 3, 5, 7 . . . ;

determining a grey value corresponding to LvB according to the obtained brightness curve and re-defining a look-up table of the liquid crystal panel related to the blue sub-pixel; and driving the liquid crystal panel according to the look-up table, wherein every two neighbored blue sub-pixels in the same line of the two neighbored columns are provided with the identical data signal.

2. A method for driving a liquid crystal panel according to claim 1, wherein each pixel unit of the pixel units further comprises a red sub-pixel and a green sub-pixel; and the data signals provided to the red sub-pixel and the green sub-pixel remain the same when the reset data parameter of the blue sub-pixel is reset.

3. The method for driving liquid crystal panel according to claim 1, wherein the liquid crystal panel further comprises a gate controller and a source controller, the gate controller provides the scan signals to the pixel units through the scan lines, and the source controller provides the data signals to the pixel units through the data lines.

4. The method for driving liquid crystal panel according to claim 1, wherein the whole grey level comprises a total grey level of 256 from grey level 0 to grey level 255.

5. A liquid crystal display comprising a liquid crystal panel and a backlight module, the liquid crystal panel and the backlight module being disposed oppositely, and the backlight module providing a light source to the liquid crystal panel so as to display an image by the liquid crystal panel, wherein the liquid crystal panel comprises:

a display area in which an array of pixel units is disposed, each pixel unit of the pixel units at least comprises a blue sub-pixel;

a plurality of scan lines for providing a plurality of scan signals to the pixel units; and a plurality of data lines for providing a plurality of data signals to the pixel units, wherein blue sub-pixels of the pixel units in every two neighbored columns are coupled to a first data line, and the first data line provides an identical data signal to the blue sub-pixels in a same line of the two neighbored columns;

wherein driving the liquid crystal panel so as to display an image according to a reset data parameter of the blue sub-pixel comprises:

obtaining a brightness curve corresponding to a whole grey level of the blue sub-pixel in the liquid crystal panel;

when a brightness values of $m^{th}$ blue sub-pixel and a brightness value of $m+1^{th}$ blue subpixel in the same line of the two neighbored columns are $LvB_m$ and $LvB_{m+1}$, respectively, setting the brightness values of the $m^{th}$ blue sub-pixel and the $m+1^{th}$ blue subpixel to LvB according to equation:

$$LvB = \frac{LvB_m + LvB_{m+1}}{2},$$

respectively; wherein m=1, 3, 5, 7 . . . , determining a grey value corresponding to LvB according to the obtained brightness curve and re-defining a look-up table of the liquid crystal panel related to the blue sub-pixel; and driving the liquid crystal panel according to the look-up table, wherein every two neighbored blue sub-pixels in the same line of the two neighbored columns are provided with the identical data signal.

6. A liquid crystal display according to claim 5, wherein each pixel unit of the pixel units further comprises a red sub-pixel and a green sub-pixel, and the data signals provided to the red sub-pixel and the green sub-pixel remain the same when the reset data parameter of the blue sub-pixel is reset.

7. The liquid crystal display according to claim 5, wherein the liquid crystal panel further comprises a gate controller and a source controller, the gate controller provides the scan signals to the pixel units through the scan lines, and the source controller provides the data signals to the pixel units through the data lines.

8. The liquid crystal display according to claim 5, wherein the whole grey level comprises a total grey level of 256 from grey level 0 to grey level 255.

* * * * *